United States Patent
Prior

[15] 3,635,194
[45] Jan. 18, 1972

[54] HIGH-PRODUCTION MACHINE UTILIZING SPRAY MASKS

[72] Inventor: William L. Prior, Newark, Ohio
[73] Assignee: Vychem, Inc., Columbus, Ohio
[22] Filed: Aug. 15, 1969
[21] Appl. No.: 870,970

Related U.S. Application Data

[62] Division of Ser. No. 679,445, Oct. 31, 1967, Pat. No. 3,531,311.

[52] U.S. Cl. ............................................ 118/301, 118/504
[51] Int. Cl. ..................................................... B05b 15/04
[58] Field of Search ............... 118/301, 504; 51/310, 311, 51/312; 117/38, 6

[56] References Cited

UNITED STATES PATENTS

| | | | |
|---|---|---|---|
| 2,426,391 | 8/1947 | Emerson | 118/301 X |
| 2,883,960 | 4/1959 | Way et al. | 118/301 |
| 3,104,181 | 9/1963 | Minnick | 118/301 X |
| 3,498,260 | 3/1970 | DeJean et al. | 118/301 X |

*Primary Examiner*—John P. McIntosh
*Attorney*—Miller, Morriss, Pappas & McLeod

[57] ABSTRACT

Apparatus for spray coating a substrate through a masking means. Means are provided for moving a mask from a station in which the substrate is sprayed through the mask, to a station having hot water spray means for cleaning and heating the mask, to a station for applying a coating solution to the mask, to a station for drying the mask, and finally back to the substrate-coating station.

4 Claims, 5 Drawing Figures

PATENTED JAN 18 1972 3,635,194

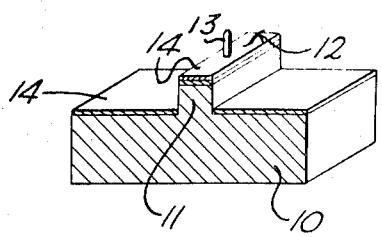

PROVIDE GELLED WATER SOLUBLE COATING (14) ON SURFACE OF SUBSTRATE (10) SOMETIMES ALSO WITH MASK (12) — STEP 1

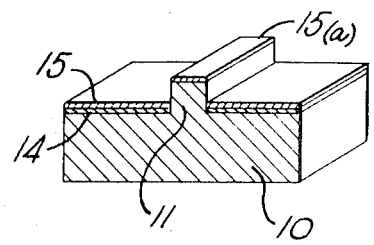

APPLY WATER INSOLUBLE COATING (15) AND (15a) TO SURFACE OF SUBSTRATE (10) AND/OR WATER SOLUBLE COATING (14) — STEP 2

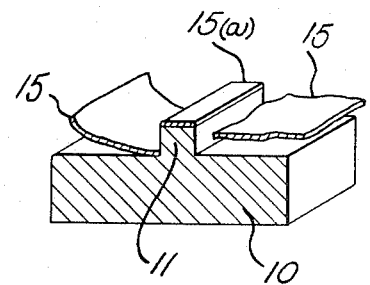

CONTACT COATED SUBSTRATE (10) WITH WATER TO REMOVE GELLED WATER SOLUBLE COATING (14) AND AT LEAST A PART OF WATER INSOLUBLE COATING (15) FROM SURFACE OF SUBSTRATE (10) — STEP 3

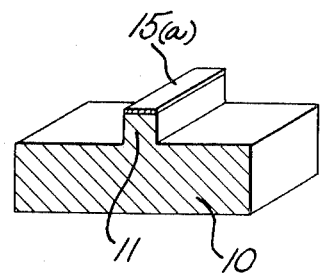

SUBSTRATE (10) WITH WATER INSOLUBLE COATING (15(a)) AND REMOVED WATER INSOLUBLE COATING (15) — STEP 4

FIG. 1

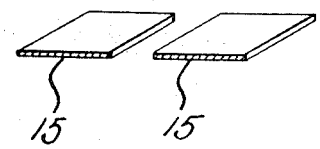

INVENTOR
WILLIAM L. PRIOR
BY
Miller, Morriss, Pappas & McLeod
ATTORNEYS

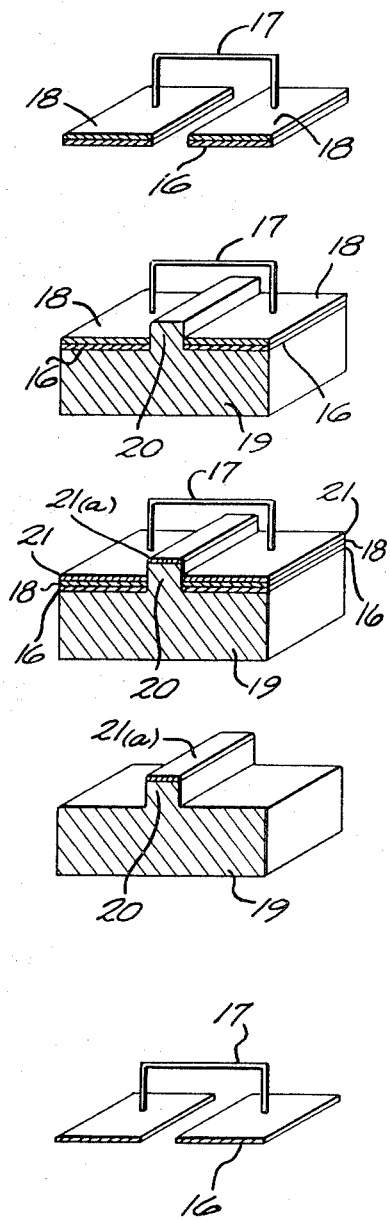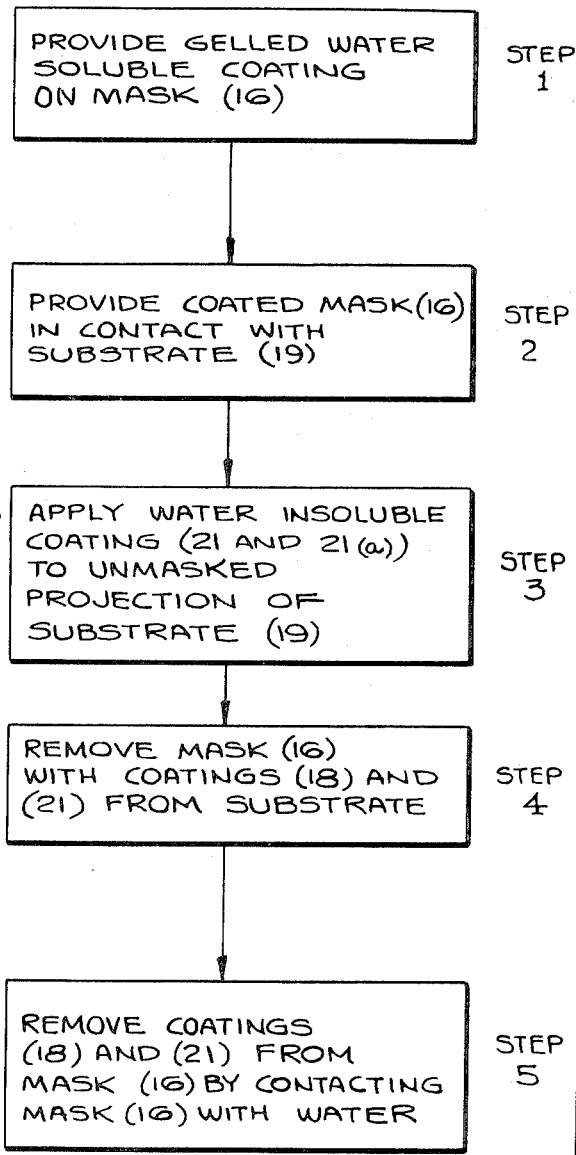
FIG. 2

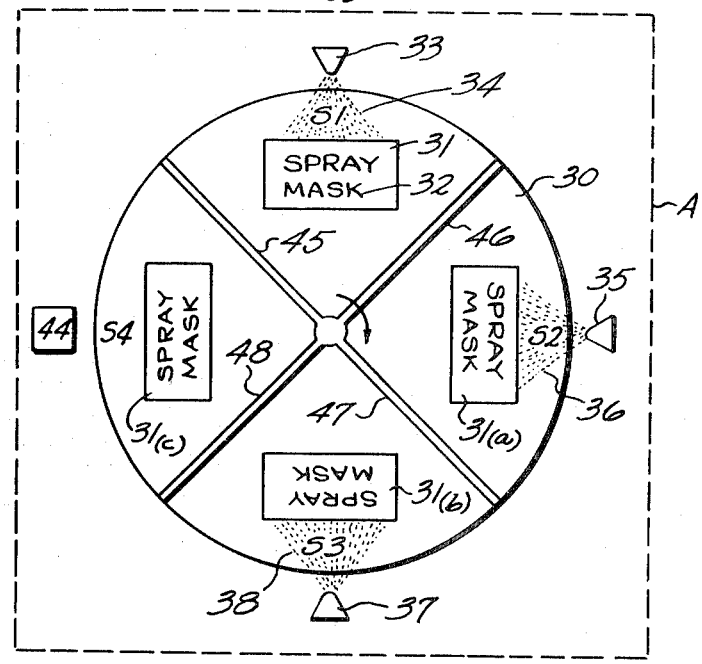
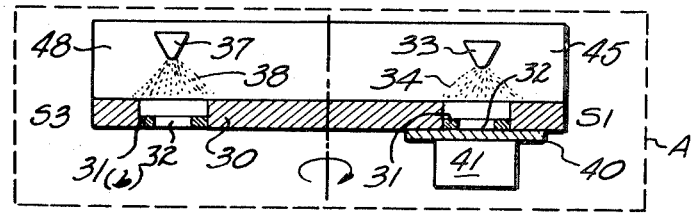
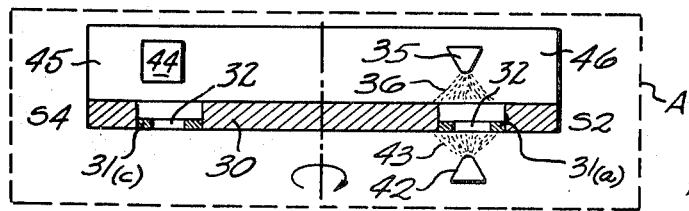

HIGH-PRODUCTION MACHINE UTILIZING SPRAY MASKS

This application is a division of my application Ser. No. 679,445, filed on Oct. 31, 1967, now U.S. Pat. No. 3,531,311, issued Sept. 29, 1970.

BACKGROUND OF INVENTION

The present invention relates to improvements in high-production coating or paint machines utilizing spray masks.

Many liquid or solid parting agents are known to the prior art. One particular class of parting agents which are of direct concern to the present invention are those which prevent the adhesion of various water-insoluble compositions to a substrate by providing a barrier between the composition and the substrate. Parting agents of this general class have particularly been used in resin and paint technology. In general these prior art parting agents are either water insoluble when applied to the substrate such as a mold or become insoluble because of subsequent treatment on the substrate and are thus very difficult to remove from the substrate.

Parting agents have been used by the prior art in admixture with various pigment fillers. These parting agents contain materials which soften or melt to facilitate removal of the parting agent composition from the substrate with heated solvents such as hot water. Softeners such as mineral oil, glycerin and wax have been used to maintain the coating in a soft state so that it can be removed with hot water by melting. These coatings dry upon application and become water insoluble thus requiring considerable effort to effectuate their removal. The pigment has been used to prevent paints or other water-insoluble coatings from penetrating through the parting agent coating to the surface of the substrate such as a mold or the surfaces of a paint spray booth. In certain instances it has been necessary to use strong alkaline solutions to effect removal of the parting agent with the water-insoluble coating from the substrate and in all instances a high-pressure solvent spray or scraping is necessary to remove these coatings.

The prior art is well developed in the area of spray masking for the definitive application of paints and the like to the surface of various substrates. High-production machinery is commercially available to definitively apply paints and the like through spray masks to various substrates with close tolerances. In order to maintain the initial tolerances of the spray masks they must be cleaned after a few cycles of use in spray painting in order to prevent clogging of and dripping of the paint from the spray mask. This cleaning operation is accomplished in such machinery with various organic solvents which dissolve the paint from the spray mask. These solvents are very volatile, inflammable and present a considerable health hazard to the operator of such machines because of contact of the solvent with the lungs and skin. Hot water or strong alkaline aqueous solutions have been used to melt or chemically dissolve the parting agents to clean the spray mask, but the removal of the paint is slow. The removal of waxes from spray masks is particularly slow and the spray from high-pressure spraying of the waxes is carried in the air and deposits where it is not wanted such as on substrates waiting to be painted. Such treatments have not displaced the general use of organic solvents for this reason.

It is an object of the present invention to provide novel improvements in high-production coating or painting machines using spray masks and to provide a novel method for the use of water-soluble parting agent compositions with spray masks. Further still it is still an object of the present invention to provide a method and machinery for the cleaning of spray masks which is simple and economical and which eliminates the hazards from the use of organic solvents by the methods of the prior art by allowing the use of water with rapid and complete removal of paint and the like from spray masks.

These and other objects will become increasingly apparent to those skilled in the art and by reference to the following drawings.

In the drawings

FIG. 1 is a schematic view of the method of the present invention illustrating the steps in the use of a water-soluble coating composition as a parting agent and particularly illustrating the use of a mask for the definitive application of water-soluble and water-insoluble coatings to selected portions of a substrate.

FIG. 2 illustrates a schematic view of the method of the present invention illustrating the steps using a water-soluble coating on a spray mask for the definitive application of a water-insoluble coating to the surface of a substrate.

FIG. 3 is a front projection view illustrating a spray mask as conventionally fabricated by the prior art defining openings for the definitive application of paint spray through the openings in the spray mask onto a substrate in contact with the spray mask.

FIG. 4 is a plan view of an improved machine with a conventional indexing table and with spray masks mounted at four stations thereon and particularly illustrating stations with means for paint spraying, cleaning, and application of the water-soluble coating compositions used as a parting agent for the spray mask.

FIG. 5 is a front view of the improved machine and indexing table shown in FIG. 4 illustrating two opposing stations for paint spraying and application of the water-soluble coating composition to a spray mask as a parting agent.

FIG. 6 is a front view of the improved machine and indexing table shown in FIG. 4, particularly illustrating the two remaining opposing stations with the means for cleaning the spray mask with water and means for the removal of at least some of the water from the water-soluble coating composition parting agent after application to the spray mask as shown in FIG. 5.

GENERAL DESCRIPTION

The present invention relates to improvements in high-production machines for the definitive application of a water-insoluble coating composition as a liquid to the surface of a substrate through masking means in contact with the substrate with an opening which defines the surface of the substrate to be coated and masking the remaining surface of the substrate which comprises (a) means for applying to the masking means an aqueous solution of a water-soluble material which forms a gelled water-soluble coating upon removal of some of the water and which prevents the adherence of a water-insoluble coating to the masking means; (b) means for removing some of the water from the aqueous solution of the water-soluble material to form the gelled water-soluble coating; and (c) means for aqueously removing the water-insoluble and gelled water-soluble coatings from the masking means.

An important feature of the present invention is that the aqueous solutions of the water-soluble materials form a gelled water-soluble coating on the surface of the substrate to be masked. As used herein the term "gelled" means that the water-soluble coating composition consists of a colloidal solution of a liquid phase in a solid phase. The liquid phase of the coating is water and the solid phase is the water-soluble material which forms a hydrated solid by the removal of water. Unexpectedly it has been found that this is a means for forming parting agent compositions which are truly water soluble. Thus it has been found that parting agents comprised of water and water-soluble ureas; alkali metal silicates, such as sodium and potassium silicate; water-soluble starches; solutions of sugars, such as corn syrup or molasses; glassy phosphates; casein; polyvinyl formals; water-soluble urethanes, water-soluble polyvinyl alcohols; and various water-soluble gelatinous materials can be used in the method of the present invention. Numerous other like materials will occur to those skilled in the art and are useful in the present invention so long as the aqueous solutions form gelled water-soluble coatings.

The water-soluble materials are applied to the surface of a substrate to be masked as an aqueous solution and then some of the water is removed to form a gelled water-soluble coating. The gelled water-soluble coatings can then be used as parting agents.

In many instances the surface of the substrate to be coated with the gelled water-soluble coating is repellent to the adherence of aqueous solutions so that the aqueous solution of the water-soluble material must be applied as a relatively thick film in order to insure complete masking of the substrate. This has been found to be disadvantageous where close tolerances must be maintained on the surface to be masked such as where definitive application of a water-insoluble material is necessary through a template to the surface. Unexpectedly it has been found that by providing known wetting agents in the aqueous solution of the water-soluble material prior to application to the substrate that a uniform thin film of the gelled water-soluble coating is formed. These wetting agents are used in small amount and are soluble in and reduce the surface tension of the aqueous solution of the water-soluble material so that the aqueous solution of the water-soluble material wets the repellent surface upon the application. A large number of wetting agents for accomplishing wetting of a surface are known to the prior art.

An important preferred feature of the present invention is the use of a gas-forming agent in the aqueous solution of the water-soluble material in an amount sufficient to increase the rate of solubilization of the gelled water-soluble coating by forming a gas in contact with an aqueous solution at elevated temperatures. It has been found that the dissolution of the gelled water-soluble coating with the gas-forming agent is very rapid even in those instances where there is limited surface contact of the gelled water-soluble coating with the heated water due to the presence of a water-insoluble covering on the gelled water-soluble coating. Thin film water-insoluble coatings such as dried paints are rapidly removed from the surface of a substrate using heated water which volatilizes the gas-forming agent. Thus inorganic and organic gas-forming agents such as hydrogen peroxide; alkanes including hexane, isohexanes, heptane; halohydrocarbons including methylene chloride, trichloroethylene, dichloroethylene and fluorocarbons; aromatics including benzene; and alcohols which have a volatilization point between about 75° and 212° F. have been used with good result when incorporated in small amounts in the gelled water-soluble coatings. Particular care must be taken in selection of the gas-forming agents that they do not rapidly evaporate from the gelled water-soluble coatings at ambient temperatures and that they are not solvents for the water-insoluble compositions. It has been particularly found that chlorofluorohydrocarbons are particularly desirable as gas-forming agents for these reasons.

When organic gas-forming agents are used in the gelled water-soluble coatings of the present invention it has been found that small amounts of emulsifying agent for the organic gas-forming agents are preferred to maintain a good dispersion of these organic materials in the aqueous solution of the water-soluble material. It has been found that lipophilic emulsifiers such as lauric acid, or oleic acid and their esters are particularly useful for dispersing small amounts of the gas-forming agents in these aqueous solutions.

As can be seen from the foregoing description, the present invention is broadly based upon the fact that the water-insoluble coatings, being immiscible with water, will not penetrate the gelled water-soluble coatings because of the presence of the water in the gelled water-soluble coatings. It can thus be seen that should the coatings be dried, so that the water is substantially removed, they would not be useful for the purposes of the present invention as parting agents. Within this limitation the steps of the method of the present invention are broadly set forth in steps 1 to 4 shown in FIG. 1.

Referring to FIG. 1 in step 1, a gelled water-soluble coating 14 is provided on the surface of a substrate 10. A mask 12 with a handle 13 is shown mounted over a projection 11 integral with the substrate 10. The gelled water-soluble coating 14 is also provided on the mask 12. The aqueous solution of the water-soluble material which forms the gelled water-soluble coating 14 is applied by spraying, brushing or other conventional application techniques and then some of the water is removed by evaporation. In step 2 the mask 12 has been removed thereby exposing the surface of the projection 11 on the substrate 10. A water-insoluble coating 15 and 15a is applied to the surface of the gelled water-soluble coating 14 and to the exposed surface of the substrate 10 on the projection 11. The gelled water-insoluble coating is a paint, resin or other water-insoluble coating material which is adherent to the surface of the projection 11 and forms water-insoluble coating 15a. Step 3 is to contact the coatings 14, 15 and 15a on the substrate 10 with water to remove the water-soluble coating 14 and at least a part of the water-insoluble coating 15 from the surface of the substrate 10. The water-insoluble coating 15a remains adhered to the projection 11 of the substrate 10, but the water-insoluble coatings 15 are removed and come off as sheets if they are of sufficient thickness. In step 4 the substrate 10 is produced with the water-insoluble coating 15a adhered to the surface of projection 11 of the substrate 10 and the water-insoluble coatings 15 are completely removed.

Having generally described the present invention the following is a specific description.

SPECIFIC DESCRIPTION

As can be seen from FIG. 1, the method of the present invention can be used to definitively coat the surface of a substrate such as the water-insoluble coating 15a on the surface of the projection 11 of the substrate 10. More specifically the method can be used to completely mask the surface of the substrate 10 as in the case where the substrate 10 is in itself a mask defining openings to a second substrate. This method is illustrated in FIG. 2.

Referring to FIG. 2, step 1 is to apply a water-soluble coating 18 to a mask 16. The mask 16 is provided with a connecting bridge 17 made of steel wire or like material in order to maintain the opening 16a in the mask 16. The mask 16 can be composed of any suitable material but is generally fabricated from a metal such as steel, beryllium, copper, or brass. The gelled water-soluble coating 18 is applied in a conventional manner preferably by spraying an aqueous solution of the water-soluble material. Step 2 is to provide the mask 16 with the coating 18 in contact with a substrate 19 with a projection 20 such that the surface of the projection 20 is exposed. Step 3 is to apply a water-soluble coating 21 to the unmasked projection 20 on the substrate 19 thereby forming an adherent water-insoluble coating 21a on the projection 20. Spray application results in coating the mask 16 with a water-insoluble coating 21 which is deposited on the surface of the gelled water-soluble coating 18. Step 4 is to remove the mask 16 with coatings 18 and 21 from the substrate, thereby producing a substrate 19 with a water-insoluble coating 21a only on the projection 20. Step 5 is to remove the coatings 18 and 21 from the mask 16 by contacting the mask 16 with water, by dissolving the water-soluble material in the gelled water-soluble coating. In order to speed up the process of the removal it is preferred to use hot water or steam. The mask 16 is then allowed to dry and the aqueous solution of the water-soluble material is reapplied to repeat the method.

The method shown in FIG. 2 can be performed manually but in general it is preferred to adapt currently available high-production spray machines to perform the method. FIG. 3 shows a conventional spray mask and FIGS. 4, 5 and 6 illustrate one type of improved machinery of the present invention for this purpose.

FIG. 3 illustrates a conventional spray mask 22 made of steel or like material with openings 23 defining the words "Spray Mask." Bridges 27, 28 and 29 are provided to support the center portion of the letter "P" 24, the center portion 25 of the letter "R" and the center portions of the letters "A" 23 and 26. In general conventional spray masks are much more detailed than the spray mask 22 illustrated in FIG. 3, but in principle their construction is the same.

FIG. 4, 5 and 6 illustrate the improved machine with a spray mask 31 as the spray mask 22 shown in FIG. 3, mounted at four stations S1, S2, S3 and S4 on a horizontally oriented conventional indexing table 30. The spray mask 31 is provided with openings 32 defining the words "Spray Mask." The letter A designates a cabinet or like housing for the improved machine. Referring to S1, a clean spray mask 31 is provided over a part 40 for definitive application of the words "Spray Mask" through the openings 32. Feed machinery 41 is provided for the part 40 in order to repetitively sequence parts 40 beneath the spray mask 31. Disposed above the spray mask 31 is a paint 34 spray unit 33 which is actuated remotely by the operator. The spray mask 31 may be used several times in the first station before becoming clogged with the paint 34. Upon clogging of the mask 31, the table 30 is indexed to S2 either manually or automatically by the operator, and clean spray mask 31c is positioned under the paint 34 spray unit 33. At S2, hot water sprays 36 and 43 from spray units 35 and 42 are impinged upon the coated mask 31b and the accumulated paint 34 and the gelled water-soluble coating 38 is removed by the water spray 36 and 43. It is preferred that hot water be used to remove the paint 34 and gelled water-soluble coating 38 in order to heat the spray mask 31a so that an aqueous solution of a water-soluble material will rapidly gell at S3. At S3 the heated spray mask 31b is coated on the top surface with a gelled water-soluble coating 38 using a spray unit 37 to apply an aqueous solution of a water-soluble material. In general it is necessary to coat only the top of the spray mask 31b with the gelled water-soluble coating 38, since this is the direction of application of paint 34 at S1. At S4 the spray mask 31c is contacted with hot air by a blower 44 for a sufficient length of time to gell the aqueous solution of the water-soluble material by the removal of some of the water but not to dry the water-soluble coating 38. The spray mask 31c is then recycled to S1 for reuse.

In general the operation of the improved machine shown in FIGS. 4, 5 and 6 is considered to be automatic even though requiring actuation of the indexing table 30 by the operator. It is possible however to adjust the machine for automatic sequencing based upon one or more applications of paint 34 through the spray mask 31.

It is preferred, although not mandatory, to provide shields 45, 46, 47 and 48 to prevent interference of operations at S1 to S4 with each other. Various pieces of electrical equipment can be included to accomplish indexing of the table 30 and positioning of the part 40 with positioning means 41 as is known in the prior art. Drain systems (not shown) are provided particularly at S2 and S3 as is conventionally known in machinery of this kind using organic solvents. It is also to be pointed out that the indexing table 30 can be disposed vertically with means for unlatching the spray mask 31 so that it can be disposed horizontally for application of the paint 34. This modification is also known in the prior art.

In general it was found that the solids concentration of the aqueous solution of water-soluble material must be such that it has sufficient viscosity to adhere to the substrate. In general this is easily determined by those skilled in the art. When the water-soluble material is sodium silicate it is preferred to use between about 3 to 55 percent by weight of sodium silicate based upon the combined weight of water and sodium silicate. It is preferred that the composition with all the additive materials have a viscosity between about 70 to 3,000 centipoises at 68° F.

In general the alkali metal silicates, particularly the sodium silicates, are the preferred water-soluble materials for the composition and methods of the present invention. When the ratio of silica to alkali is higher then about 3.22 to 1 the results are very poor. In general the silica-to-alkali ratio should not be less than about 1.6 to 1.

It was found that the wetting agent should be present in an amount between about 0.5 and 3.0 percent by weight based upon the weight of the aqueous solution of the water-soluble material. In general these wetting agents are organic.

When the percentage of the gas-forming agent by weight of the aqueous solution is increased to too high a level poor wetting of the substrate results. It is therefore preferred to use up to about 3.0 percent by weight of the gas-forming agent based upon the weight of the aqueous solutions of the water-soluble materials. Hydrogen peroxide was an effective inorganic gas-forming agent, however it has a tendency to decompose with time and is therefore not preferred.

With the organic gas-forming agents such as the halogenated hydrocarbons an emulsifying agent is used in order to produce an effective mixture of the gas-forming agent in the aqueous solution of the water-soluble material. This is necessary because these organic gas-forming agents do not dissolve in the aqueous solution. In the case of the halogenated hydrocarbon gas-forming agents, it was found that lipophilic emulsifiers such as lauric acid or oleic acid and their esters were particularly effective. It was found that between 0.05 and 2.0 percent of the emulsifying agent based upon the weight of the gas-forming agent was effective for this purpose. It was also found that sorbitan monooleate (Emsorb 2500 and 6900 $_{T.M.}$) and sorbitan monolaurate (Emsorb 2515 and 6915$_{T.M.}$) manufactured by Emery Industries Inc. were also particularly effective as emulsifying agents. The properties of these and other materials as emulsifying agents are well known to those skilled in the art.

A wide variety of water-soluble materials were used and it was found that they were in general less effective than the sodium silicate water-soluble coating compositions as parting agents. In general it was found that the effectiveness of particular water-soluble materials was directly dependent upon their ability to form a gelled, continuous, high-density film. It was also found that these water-soluble materials exhibited a greater or lesser degree of wetting of a substrate to which they were applied depending upon the thickness of the coat, the nature of substrate and whether or not a wetting agent was present. For thin films, as is necessary for maintaining dimensional tolerances with spray masks, it was found that a wetting agent was necessary in order to form the thin film. The term "thin film" as used herein means that the film is between about 2 to 6 mils thick which produces a coating of the aqueous solution before evaporation of any water of between about 0.02 to 0.04 pound per square foot.

Numerous kinds of substrates including both organic and inorganic were used with good results. It was found in general that if the aqueous solution of the water-soluble material wetted metals, it would wet substrates composed of other materials.

A large variety of water-insoluble coating compositions which would adhere to a particular substrate were used. It was found that the compositions were equally effective as to all such paint materials and that they did not penetrate the water-soluble coating. Such paints include alkyd-, epoxy- and styrene-based paints with a finely divided pigment in a wide variety of colors including both inorganic and organic pigments.

It was also found that the gelled water-soluble material coatings of the present invention can be used as parting agents for various molded-resin products. The action of the gelled water-soluble coatings as parting agents was independent of the thickness of the coating of water-insoluble material deposited on the water-soluble materials. Thus the compositions of the present invention are particularly suited for wide variety of molding operations such as plastic- or resin-based boats as well as various other molded products.

In preparing the water-soluble material compositions of the present invention it is preferred to mix the wetting agent with the aqueous solution of the water-soluble material and, if used, separately mix the gas-forming agent with the emulsifying agent by conventional mixing equipment. The two components are mixed together in a single mixer until they are blended together. Care should be taken that the mixing is only sufficient for good blending of the ingredients without introducing air or other gaseous materials into the formulations which would impair the coating ability of the water-soluble coating compositions. Equipment for such mixing is well known to those skilled in the art.

Various additive materials were incorporated into the compositions of the present invention in an attempt to retard the gelation time of the water-soluble material coatings. Thus for instance small amounts of glycerine and diethylene glycol were used with the sodium silicate without any particularly effective result. Small amounts of various elastomeric material such as rubber emulsions and the like can can be incorporated in the aqueous solutions to retard the gelation time, but in general they are unnecessary and not preferred for the purposes of the present invention.

The water-soluble material coatings of the present invention range in hardness from tacky to relatively firm and hard, but in each instance the gell coating contains a considerable amount of water. In general a portion of the water from the aqueous solution is entrapped in the structure of the water-soluble material thus forming a gell-like structure. It is for this reason that care must be taken to insure that the water is not completely removed from the water-soluble coating and that sufficient water remains in order to retard the penetration of the water-soluble material by paints and the like.

As used herein, the term "parting agent" means that the composition acts to release itself from the surface of a substrate to which the composition is applied, either with or without a water-insoluble composition applied in addition on the water-soluble material, in the presence of water.

It is intended that the foregoing description only be illustrative of the present invention and it is intended that this invention be limited only by the hereinafter-appended claims.

I claim:

1. In a high-production machine for the definitive application of a water-insoluble coating composition as a liquid to the surface of a substrate through masking means in contact with the substrate with an opening which defines the surface of the substrate to be coated, and masking the remaining surface of the substrate, the improvement which comprises in sequence:
   a. a first station comprising means to heat the spray mask including means for providing and applying heated water to the masking means for removing a previously applied gelled water-soluble coating with a superimposed water-insoluble coating and which heats the masking means;
   b. a second station including means for applying to the heated masking means an aqueous solution of a water-soluble material which forms a gelled water-soluble coating upon removal of some of the water which prevents the adherence of the water-insoluble coating to the masking means, sufficient heat being imparted to the masking means to remove some of the water from the solution after application to the masking means;
   c. a third station including drying means for removing additional water from the aqueous solution of water-soluble material to form the gelled water-soluble coating;
   d. a fourth station for applying the water-insoluble coating through the openings in the masking means wherein it is also superimposed on the gelled water-soluble coating on the masking means; and
   e. means to sequentially move the mask from station to station.

2. The machine of claim 1 wherein the means for applying the aqueous solution of the water-soluble material to the masking means is a spray gun.

3. The machine of claim 1 wherein the means for applying the heated water is a high-pressure hot water spray gun.

4. The machine of claim 1 wherein the drying means for removing some of the water is a hot air blower.

* * * * *